US010485332B2

(12) United States Patent
Luebke et al.

(10) Patent No.: US 10,485,332 B2
(45) Date of Patent: Nov. 26, 2019

(54) LOCKING MECHANISM FOR A TABLE

(71) Applicant: Kustom Seating Unlimited, Inc., Bellwood, IL (US)

(72) Inventors: William John Luebke, Aurora, IL (US); Antonio Lazzara

(73) Assignee: Kustom Seating Unlimited, Inc., Bellwood, IL (US)

( * ) Notice: Subject to any disclaimer, the term of this patent is extended or adjusted under 35 U.S.C. 154(b) by 0 days.

(21) Appl. No.: 15/927,712

(22) Filed: Mar. 21, 2018

(65) Prior Publication Data
US 2019/0289995 A1 Sep. 26, 2019

(51) Int. Cl.
*A47B 3/083* (2006.01)
*B61D 37/00* (2006.01)
*B60N 3/00* (2006.01)
*A47B 3/08* (2006.01)

(52) U.S. Cl.
CPC ............ *A47B 3/083* (2013.01); *A47B 3/0809* (2013.01); *B60N 3/001* (2013.01); *B61D 37/00* (2013.01)

(58) Field of Classification Search
CPC ........... A47B 23/04; A47B 31/06; A47B 5/04; A47B 5/06; A47B 13/088; A47B 13/02; A47B 13/081; A47B 9/00; F16F 7/12
USPC ....... 108/167, 168, 171, 172, 6; 297/216.16, 297/216.17, 216.18
See application file for complete search history.

(56) References Cited

U.S. PATENT DOCUMENTS

| | | | | | |
|---|---|---|---|---|---|
| 1,209,421 | A | * | 12/1916 | Ferguson | A47B 3/087 108/168 |
| 2,991,139 | A | * | 7/1961 | Fihe | A47B 25/00 108/168 |
| 3,545,738 | A | * | 12/1970 | Stagg | A61G 13/105 108/167 |
| 4,157,089 | A | * | 6/1979 | Loughrey | A61G 13/105 108/116 |
| 6,109,689 | A | * | 8/2000 | Nanni | B60N 2/2821 248/638 |
| 6,164,016 | A | * | 12/2000 | Bue | E04H 3/28 108/167 |
| 6,224,131 | B1 | * | 5/2001 | Shammout | B60N 2/4221 296/68.1 |
| 6,412,863 | B1 | * | 7/2002 | Merrick | B60N 2/242 297/216.18 |
| 6,851,564 | B2 | * | 2/2005 | Ng | A47B 43/00 108/171 |
| 10,017,193 | B2 | * | 7/2018 | Pailler | A47B 5/04 |
| 2010/0116176 | A1 | * | 5/2010 | Witkowski | A47B 3/083 108/50.12 |
| 2015/0366337 | A1 | * | 12/2015 | Luebke | A47B 13/081 108/44 |

* cited by examiner

Primary Examiner — Jose V Chen
(74) Attorney, Agent, or Firm — McCracken & Gillen LLC

(57) ABSTRACT

A table and a method of locking a table are disclosed. The table includes a central tube. A first frame and a second frame are disposed on opposite sides of the central tube, a bearing is coupled to the first frame and the second frame, a weight is coupled to the central tube, and a latch is coupled to the weight. The latch blocks movement of the bearing away from the central tube until one of acceleration and deceleration of at least a predetermined amount is applied to the table.

20 Claims, 13 Drawing Sheets

LOCKING MECHANISM FOR A TABLE

FIELD OF DISCLOSURE

The present subject matter relates to tables and more particularly, to a locking mechanism for an energy absorbent table.

BACKGROUND

A transit car may include a workstation table disposed between facing seats. If the transit car abruptly decelerates, for example, because of an accident, a passenger in one of the seats facing the direction of the movement of the transit car could suddenly be thrust into the workstation table. The impact of the passenger with a tabletop of the workstation table may seriously injure the passenger unless the table is able to absorb the energy of the moving passenger. One type of energy absorbent table includes a tabletop that deforms or collapses when an edge of the table is struck with sufficient force. A locking mechanism may be installed in such a table that prevents unintended deformation of the tabletop that may occur, for example, when the passenger is navigating around or bumps into the table, but that releases when the table encounters an inertial force such as a sudden deceleration or acceleration. After the lock is released, the tabletop may deform if the passenger impacts the tabletop with a force sufficient to injure such passenger unless absorbed by the table.

SUMMARY

According to one aspect, a table includes a central tube, a first frame and a second frame disposed on opposite sides of the central tube, a bearing coupled to the first frame and the second frame, a weight coupled to the central tube, and a latch coupled to the weight. The latch blocks movement of the bearing away from the central tube until one of acceleration and deceleration of at least a predetermined amount is applied to the table.

According to another aspect, a method of locking a table that includes a central tube, a first frame, and a second frame comprises the steps of coupling a bearing to the first frame and the second frame, coupling a weight to the central tube, and coupling a latch to the weight. The method also includes the step of disposing the weight so that the latch is positioned to block movement of the bearing away from the central tube until one of acceleration and deceleration of at least a predetermined amount of is applied to the table.

Other aspects and advantages will become apparent upon consideration of the following detailed description and the attached drawings wherein like numerals designate like structures throughout the specification.

DETAILED DESCRIPTION

Luebke et al., U.S. Pat. No. 9,295,325, issued Mar. 29, 2016, discloses an energy absorbent table that includes a table top having a first panel and a second panel, and a deforming mechanism coupled to the first and the second panel. When a force is applied to an outer edge of the table, the deforming mechanism causes the first and the second panels to move from a first configuration in which the two panels occupy substantially parallel planes to a second configuration in which the two panels occupy planes that are not substantially parallel. The entire contents of this patent, and U.S. Provisional Patent Application No. 62/016,405 to which such patent claims benefit, are incorporated herein by reference.

Figure 1:
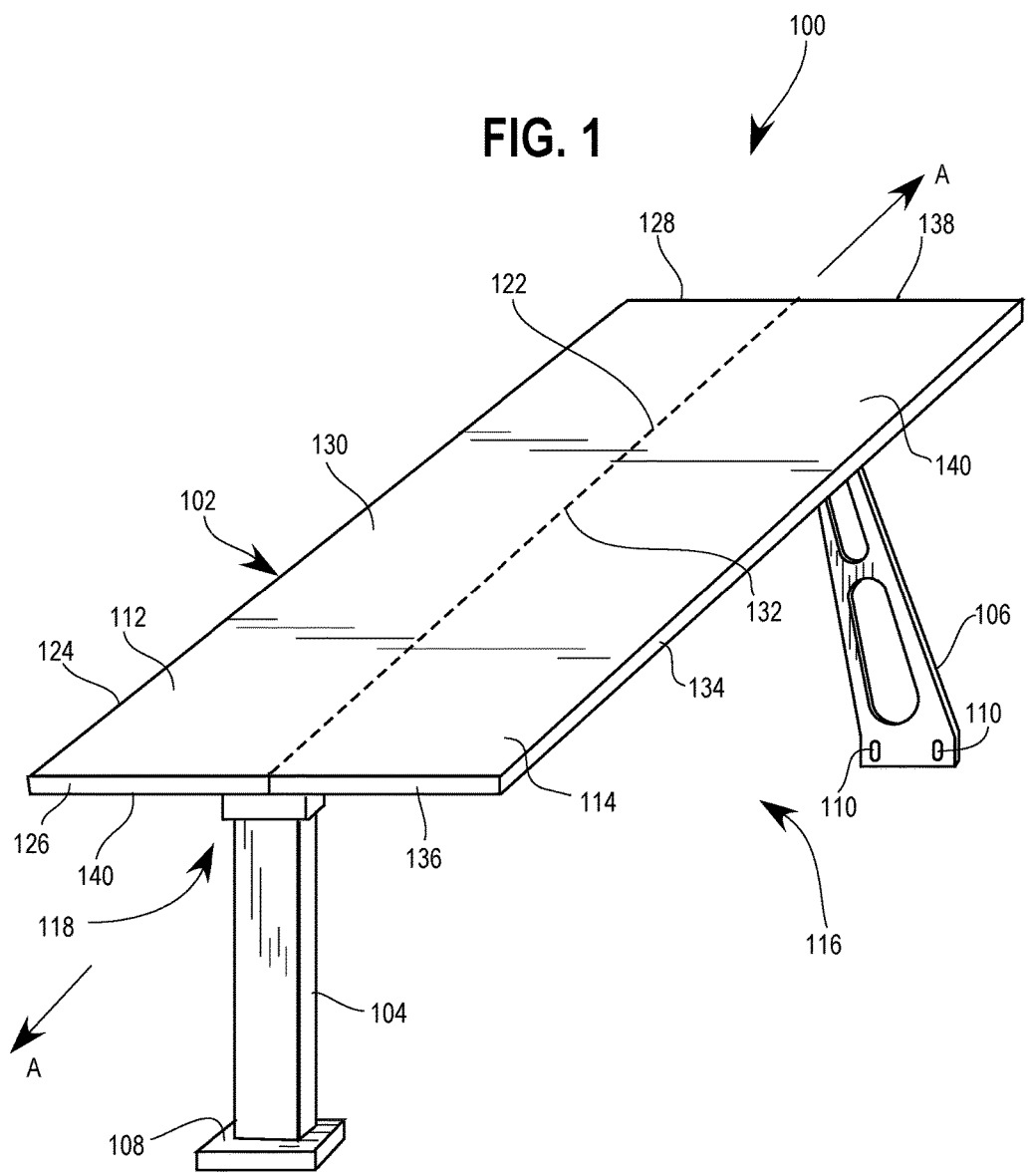
FIG. 1 is an isometric view of a table for use in a vehicle.
Figure 2:
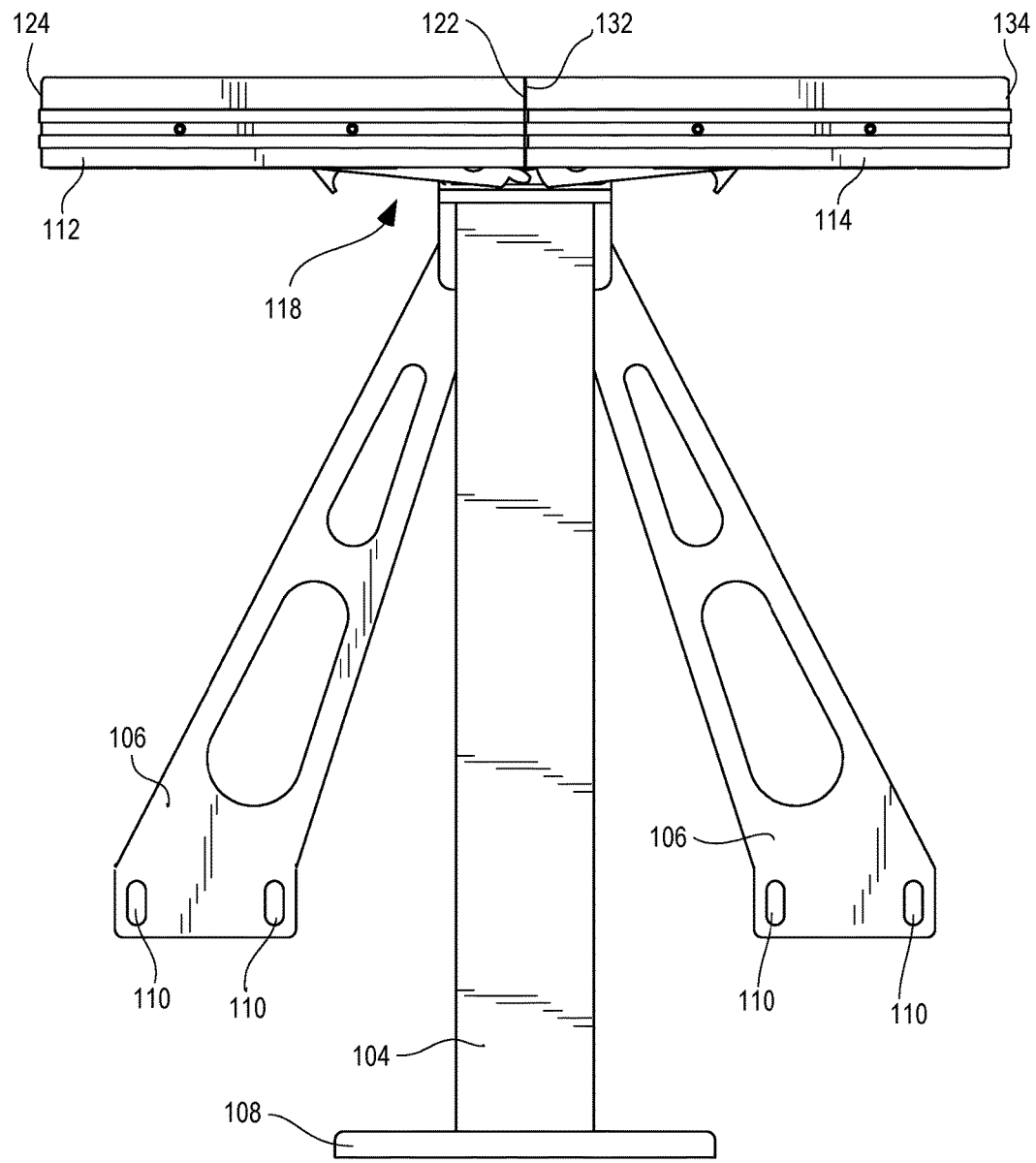
FIG. 2 is a front elevational view of the table of FIG. 1.
Figure 3:
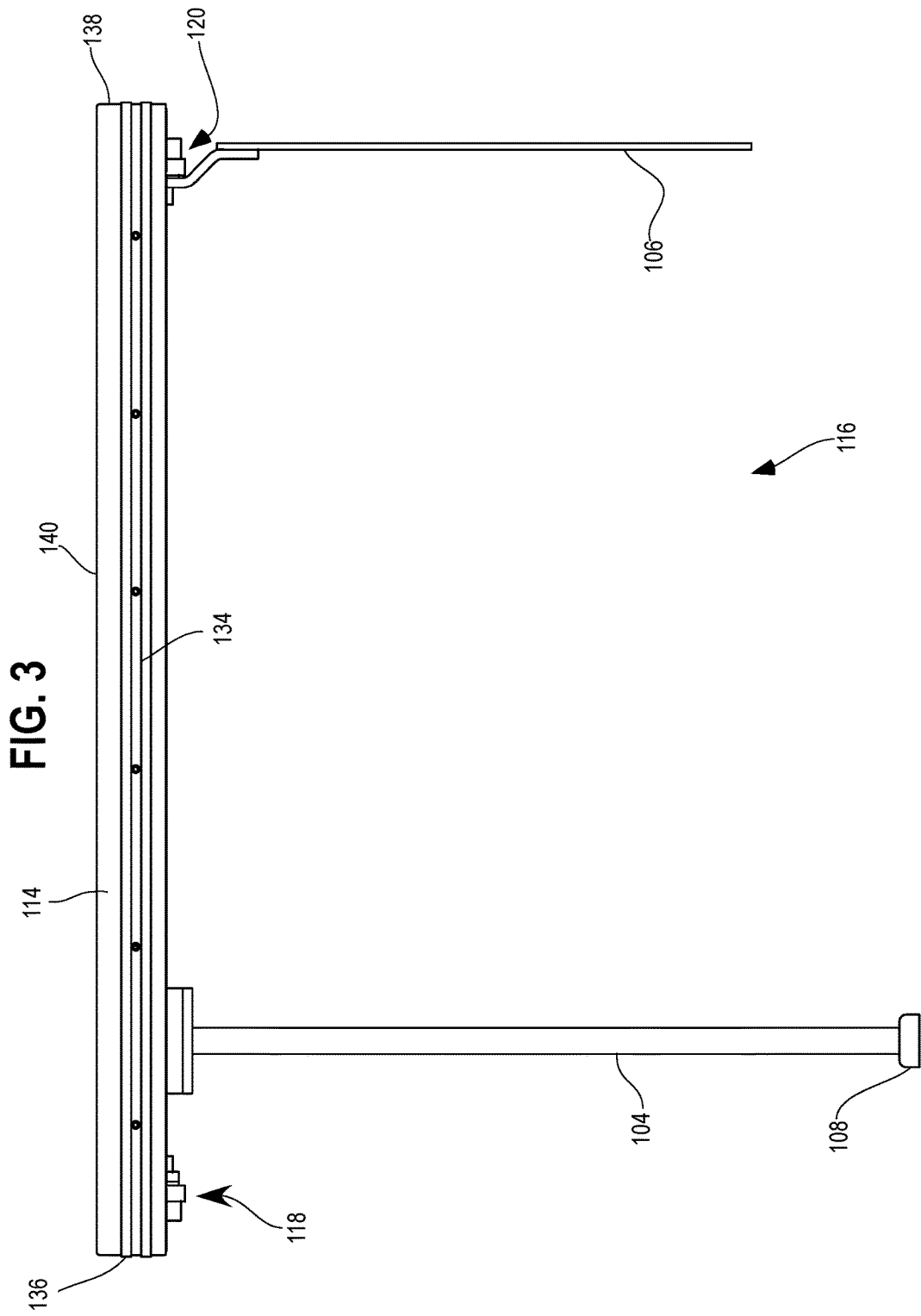
FIG. 3 is a side elevational view of the table of FIG. 1.

Referring to FIGS. 1-3, a workstation table 100 comprises a tabletop 102 disposed atop a front support 104 and a rear support 106. The workstation table 100 may be disposed in a vehicle, for example, a transit car, a rail car, a tram, a bus, an airplane, and the like. If the vehicle has an aisle, the front support 104 may be proximate the aisle of the vehicle. In some embodiments, a bottom portion 108 of the front support 104 may be secured to a floor (not shown) of the vehicle. In addition, the workstation table 100 may be disposed in the vehicle so that the rear support 106 may be secured to a sidewall (not shown) of the vehicle.

The tabletop 102 includes a first side portion or panel 112 and a second side portion or panel 114. The front support 104 may be disposed between the first panel 112 and the second panel 114. In some embodiments, the front support 104 may be aligned with a centerline A-A between the first panel 112 and the second panel 114. In some cases, the tabletop 102, the front support 104, and the rear support 106 may be disposed to create a space 116 under the tabletop 102. Such space 116 provides legroom for individuals seated at the workstation table 100. In some embodiments, the first panel 112 and the second panel 113 are separate members of the tabletop 102. In other embodiments, the first panel 112 and the second panel 114 are an integral unit, and are, for example, portions of a contiguous sheet of material that comprises the tabletop 102.

Each side panel 112 and 114 may be coupled to a first deforming mechanism 118 and a second deforming mechanism 120, which are described below. The first panel 112 may include an inside edge 122, an outside edge 124, a front edge 126, a rear edge 128, and a top surface 130. The inside edge 122 and the outside edge 124 may be substantially parallel and opposite one another, and the front edge 126 and the rear edge 128 may be substantially parallel and opposite one another.

Similarly, the second panel 114 may include an inside edge 132, an outside edge 134, a front edge 136, a rear edge 138, and a top surface 140. The inside edge 132 and the outside edge 134 may be substantially parallel and opposite one another, and the front edge 136 and the rear edge 138 may be substantially parallel and opposite one another.

In some embodiments, the inside edge 122 of the first panel 112 may abut or be proximate the inside edge 132 of the second panel 114 along the centerline A-A. Further, in some embodiments, when the tabletop 102 is in an undeformed configuration (as shown in FIG. 1), the plane of the top surface 130 of the first panel 112 may be substantially parallel to the plane of the top surface 140 of the second panel 114. In some embodiments, when the table 100 is in the undeformed configuration, one or both of the planes of the top surface 130 and the top surface 140 may be substantially parallel to the plane of the floor to which the bottom portion 108 of the front support 104 is secured. In some embodiments, the top surface 130 and the top surface 140 may be substantially coplanar. Further, in some embodiments, the front edges 126 and 136 may be substantially collinear and/or the rear edges 128 and 138 may be substantially collinear.

Figure 4:
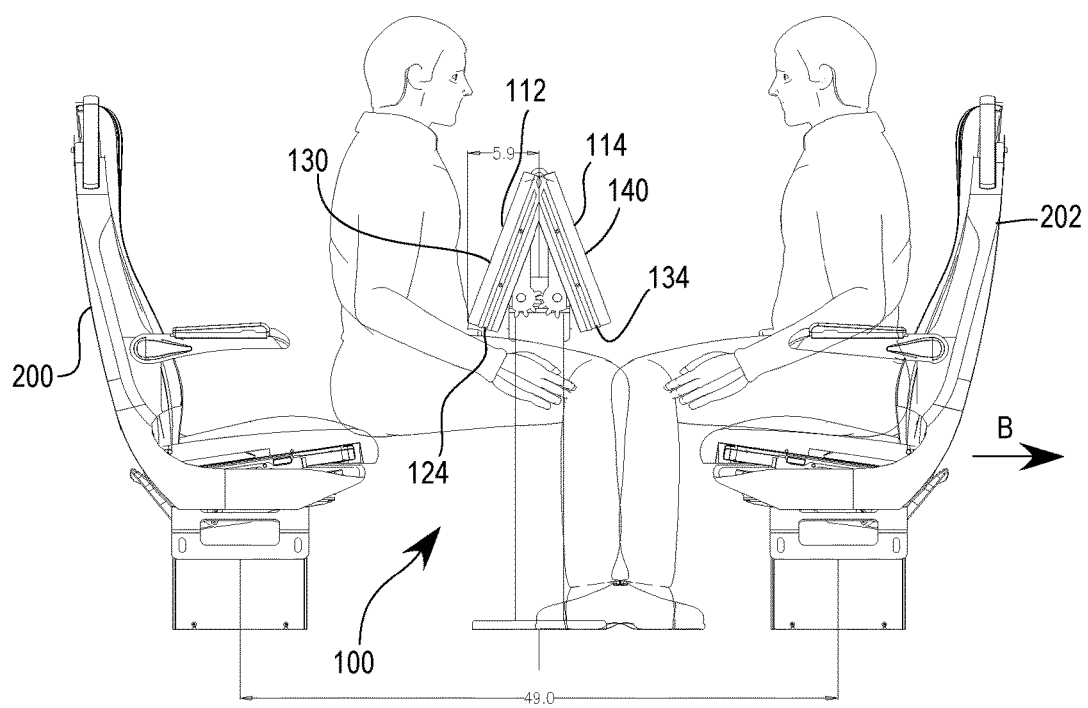
FIG. 4 is an elevational view of the table of FIG. 1 disposed in a vehicle between two passengers, a top portion of the table shown in a collapsed configuration.

Referring to FIG. 4, if the workstation table 100 is disposed in a transit car that is moving in a direction B, and the transit car experiences sudden deceleration, the momentum of the passenger seated in the seat 200 may cause the passenger to continue to move in the direction B at a speed greater than that of the transit car and workstation table 100. If the deceleration is significant, the passenger's body may not decelerate sufficiently in time to avoid contact with the outside edge 124 of the first panel 112 of the workstation table 100, as shown in FIG. 4B. If the passenger's body continues to move in the direction B faster than the transit car, even after such contact, the force of the passenger's body against the outside edge 124, and hence, the first panel 112, causes the tabletop 100 to deform (or collapse or buckle). In particular, the deforming mechanisms 118 and 120 cause the first panel 112 and the second panel 114 to move from a configuration in which the top surfaces 130 and 140 thereof, respectively, occupy parallel planes or are coplanar, and into a configuration in which such top surface 130 and 140 no longer occupy parallel planes and are not coplanar.

Figure 5:
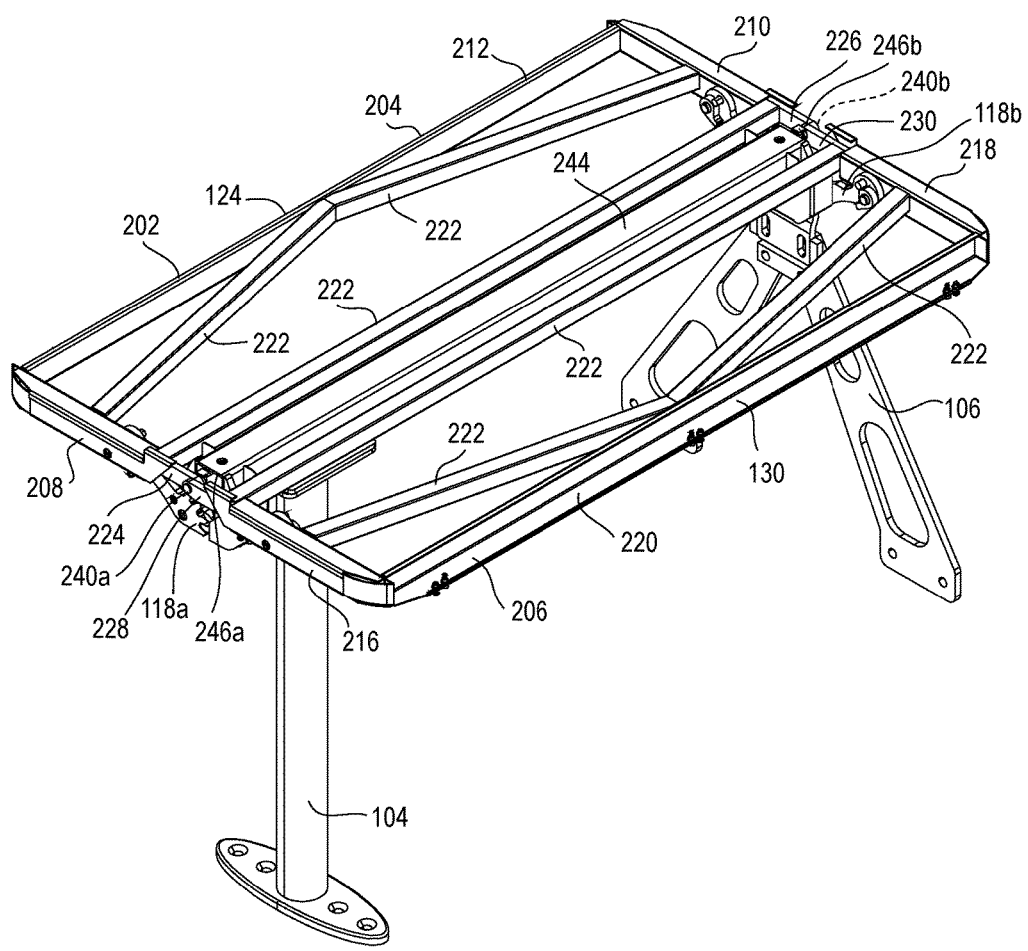
FIG. 5 is an isometric view of the table of FIG. 1, with certain elements omitted to show the internal structure thereof.
Figure 6:
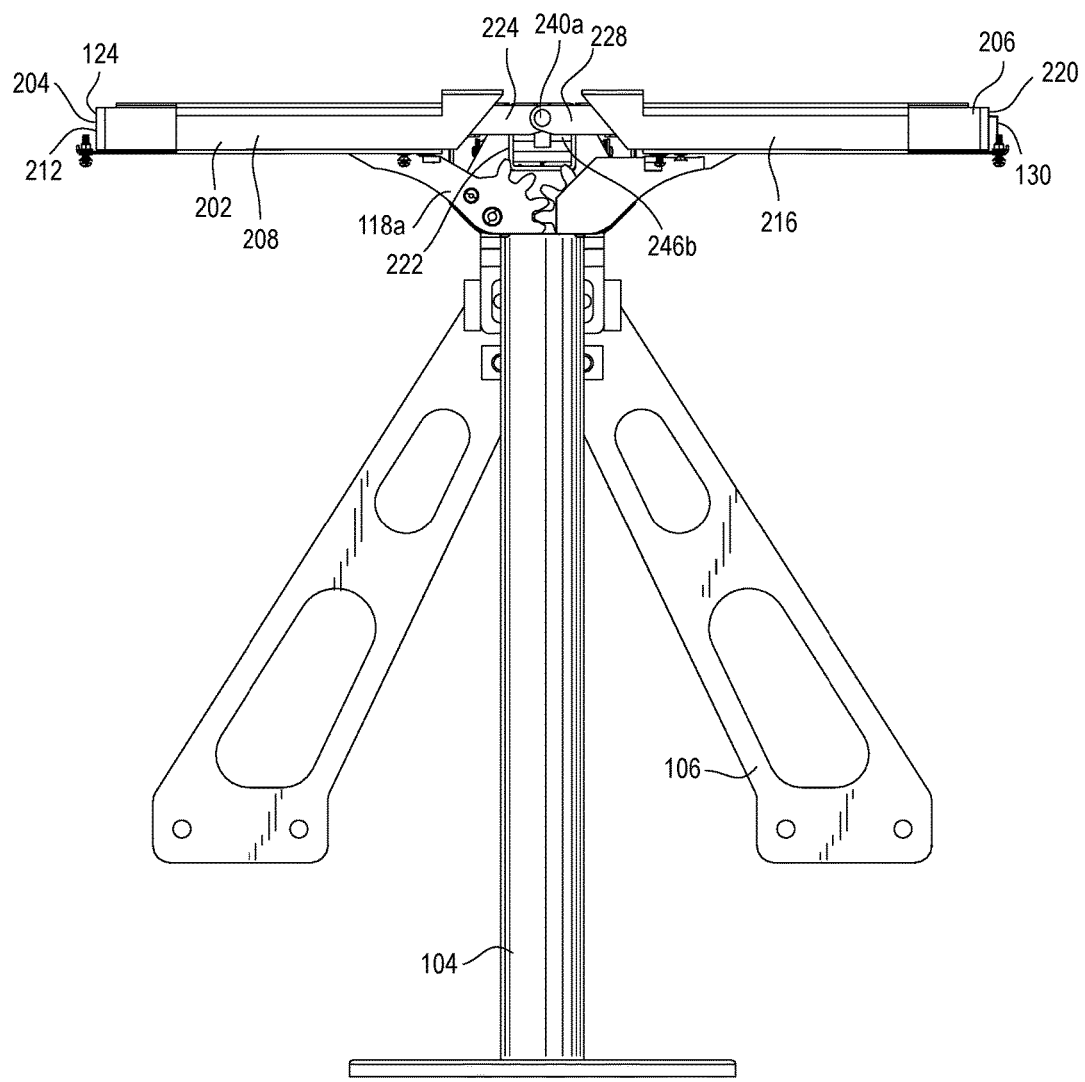
FIG. 6 is a front elevational view of the table of FIG. 1, with certain elements omitted to show the internal structure thereof.
Figure 7:
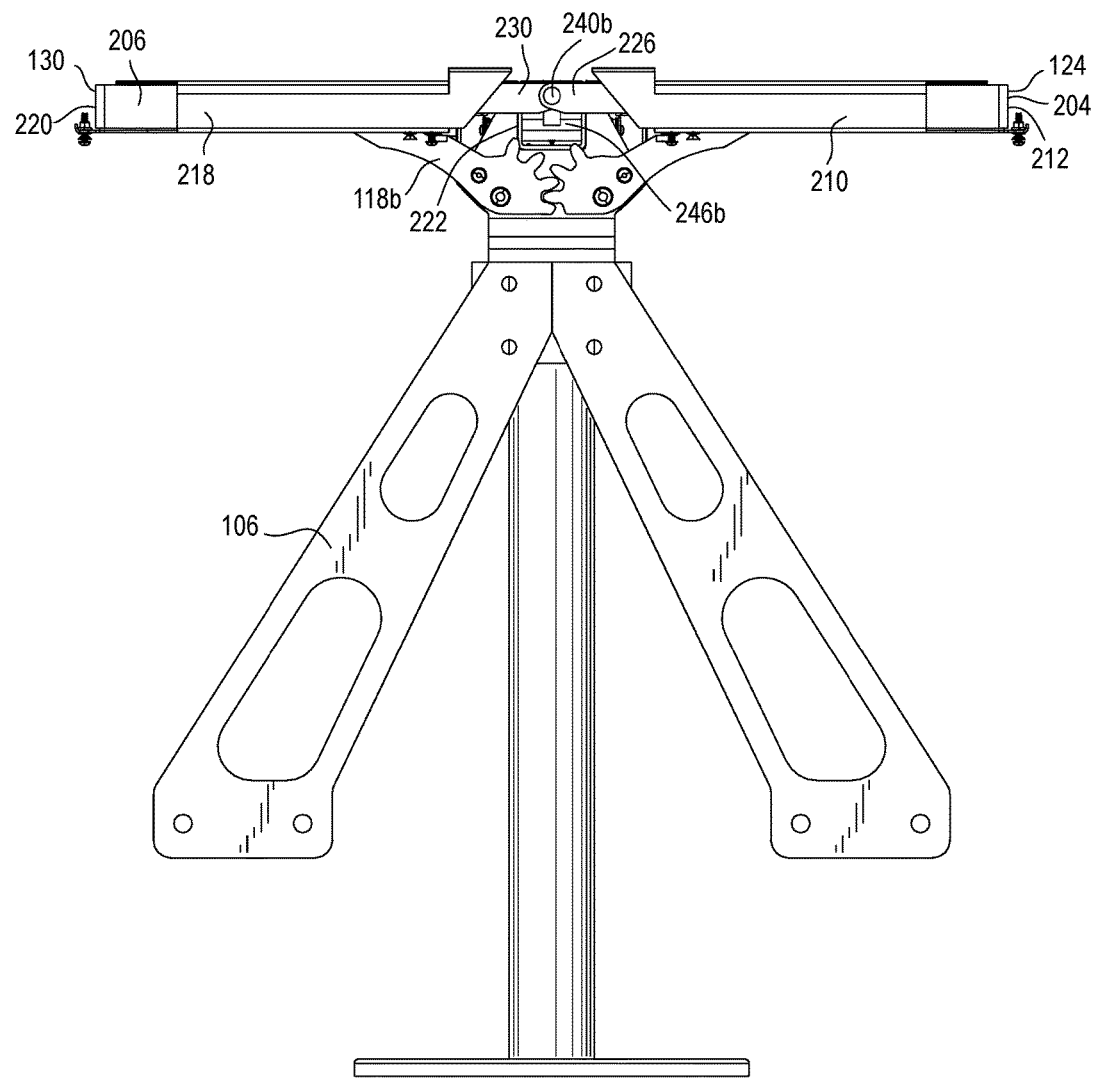
FIG. 7 is a rear elevational view of the table of FIG. 1, with certain elements omitted to show the internal structure thereof.
Figure 8:
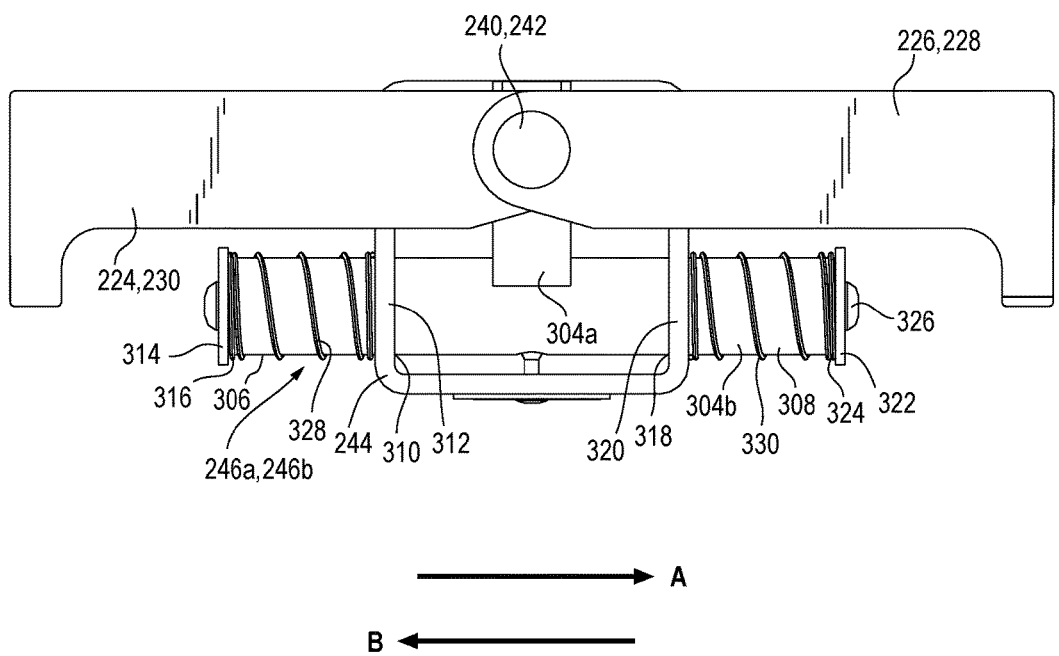
FIG. 8 is a front or rear elevational view of the table of FIG. 1, with certain elements omitted to show a locking mechanism of such table.
Figure 9:
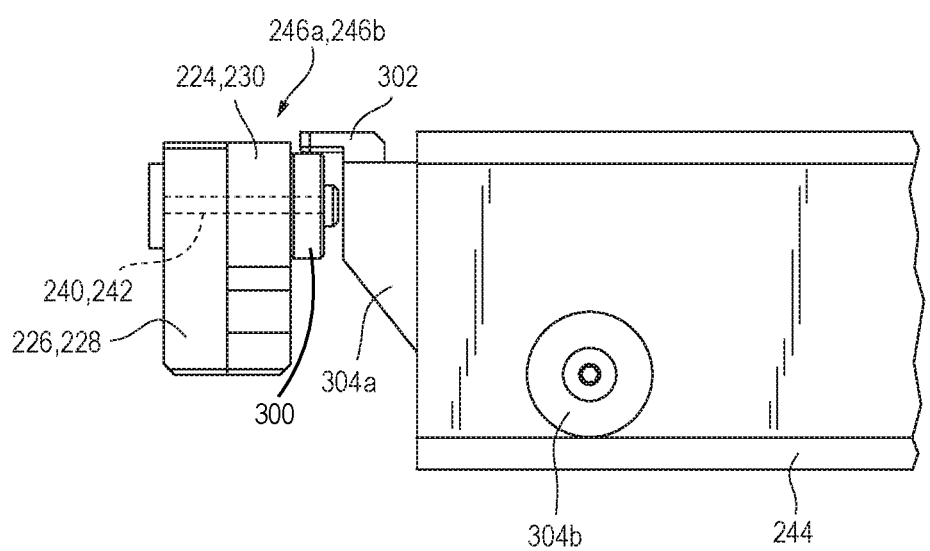
FIG. 9 is a side elevational view of the table of FIG. 1, with certain elements omitted to show the locking mechanism of FIG. 8.
Figure 10:
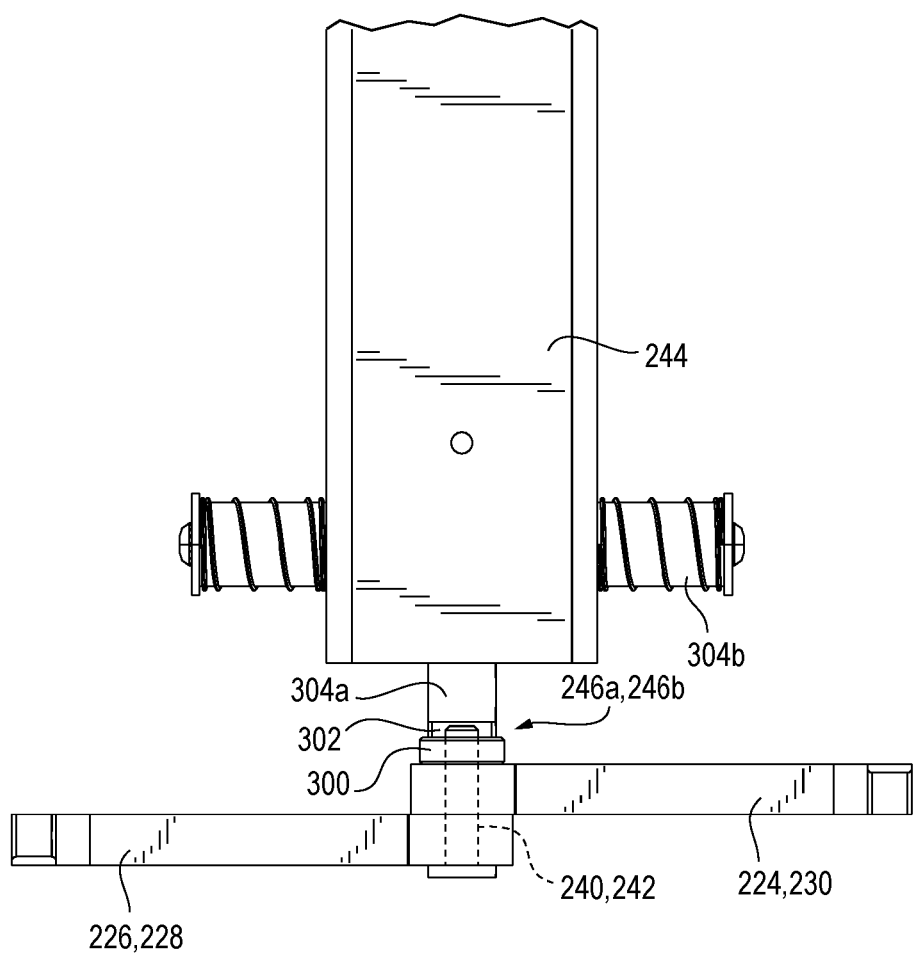
FIG. 10 is a bottom plan view of the table of FIG. 1, with certain elements omitted to show the locking mechanism of FIG. 8.
Figure 11:
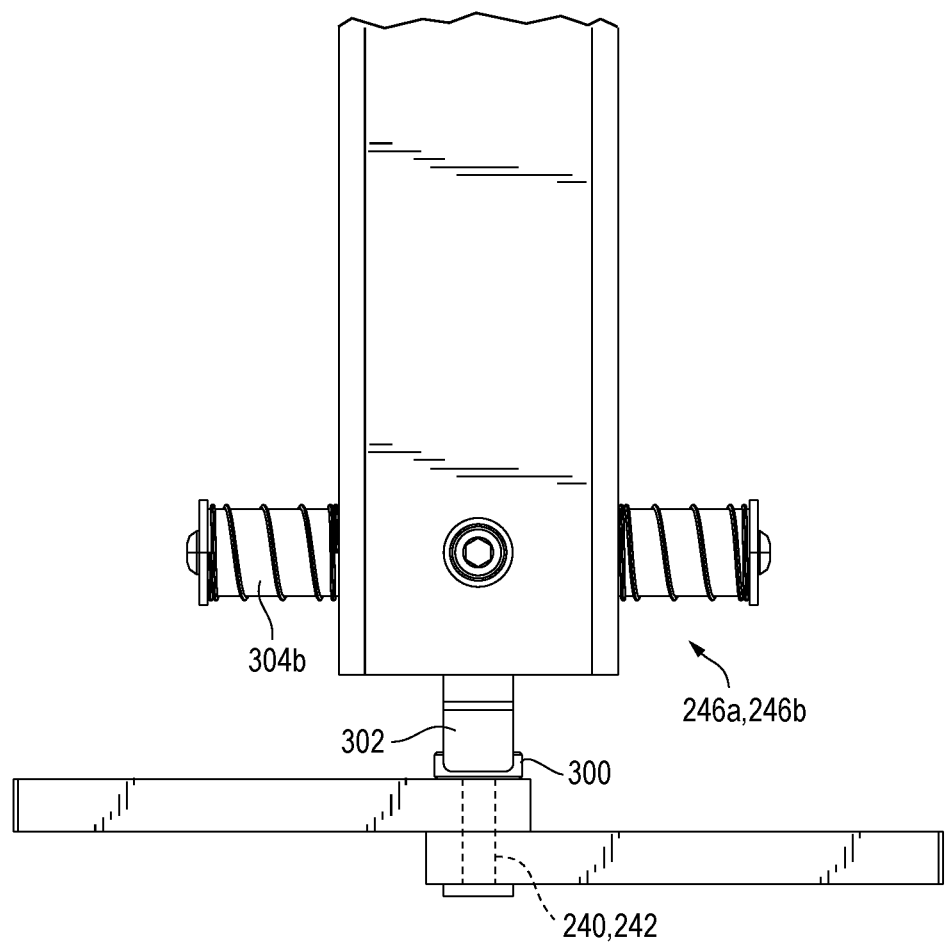
FIG. 11 is a bottom plan view of the table of FIG. 1, with certain elements omitted to show the locking mechanism of FIG. 8.

Referring to FIGS. 5-7, The tabletop 102 (FIG. 1) is supported on a frame 202 that includes a first frame portion 204 and a second frame portion 206. The first frame portion 204 includes a first end section 208 and a second end section 210. Disposed between the first end section 208 and the second end section 210 is a first frame outer edge section 212. In some embodiments, the first end section 208, the second end section 210, and the first frame outer edge section 212 are separate pieces that are fastened to one another by welding or with a bolt or screw. These pieces are fastened to one another such that the first end section 208 and the second end section 210 extend outwardly from opposite ends of the first frame outer edge section 212, and form generally a C-shape.

In other embodiments, the first end section 208, the second end section 210, and the first frame outer edge section 212 are formed from a single piece of rigid material that is bent such that the first end section 208 and the second end section 210 extend outwardly from the first frame outer edge section 212.

In some embodiments, the first end section 208, the second end section 210, and the first frame outer edge section 212 are manufactured from a metal such as aluminum or steel, a rigid thermoplastic, or another rigid material apparent to one who has skill in the art. Further, in some cases one or more of the first end section 208, the second section 210, and the first frame outer edge section 212 is manufactured from a rod, a tube, and/or an elongated plate.

Like the first frame portion 204, the second frame portion 206 also includes a third end section 216, a fourth end section 218, and a second frame outer edge section 220 disposed there between.

The first frame portion 204 and the second frame portion 208 may include one or more additional support members 222 secured thereto to provide additional support for the tabletop 102.

The first frame portion 204 includes a first extension portion 224 that extends from the first end section 208, and a second extension portion 226 that extends from the second end section 210 thereof. Similarly, the second frame portion 206 includes a third extension portion 228 that extends from the third end section 216 and a fourth extension portion 230 that extends from the fourth end section 218 thereof.

The first, second, third, and fourth extension portions 224, 226, 228, and 230 are integral with, or welded, bolted, or otherwise securely fastened to the first, second, third, and fourth first, second, third, and fourth end sections 208, 210, 216, and 218, respectively.

The first extension portion 224 of the first frame portion 204 and the third extension portion 228 of the second frame portion 206 are pivotally secured to one another by a first pin 240. Similarly, the second extension portion 226 of the first frame portion 204 and the fourth extension portion 230 of the second frame portion 206 are pivotally secured to one another by a second pin 240b.

The table 100 includes a central tube 244 secured to the legs 104 and 106. The first frame portion 204 and the second frame portion 206 are disposed relative to the central tube 244 such that the first pin 240a, the second pin 240b, and an axis of the central tube 244 are substantially collinear.

The first end section 208 of the first frame portion 204 and the third end section 216 of the second frame portion 206 are secured to the deformation mechanism 118a disposed in the aisle side of the table 100. Similarly, the second end section 210 and the fourth end section 218 of the second frame portion 206 are secured to the deformation mechanism 118b on the wall side of the table 100. As described hereinabove, when sufficient energy is applied to either first or second frame outer edge sections 212 or 220, the first and second frame portions 204 and 206, respectively, will be forced upwards away from the legs 104 and 106, and the deformable components of the deformation mechanisms 118a and 118b will absorb such energy.

To prevent inadvertent upward movement of the first frame portion 204 and the second frame portion 206, and deformation of the table 100, unless the table 100 is subject to at least a predetermined amount of inertial force (or acceleration or deceleration), the table 100 includes a first locking mechanism 246a and/or a second locking mechanism 246b. Such predetermined amount of force may be caused, for example, from a sudden acceleration or deceleration of a moving vehicle in which the table 100 is disposed. The acceleration or deceleration causes the locking mechanism 246 to release, and subsequent sufficient impact to the outside edges 124 or 132 of the table 100, for example by being struck a moving body causes the table to deform. Thus, the locking mechanism 246 prevents the table from deforming (or folding) unless the impact to the outside edges 124 or 132 occurs, for example, during sudden deceleration o of the vehicle. Such sudden deceleration may occur, for example, during a crash situation.

In some embodiments, the table includes only one of the first or the second locking mechanism 246a or 246b, respectively. In other embodiments, the table 100 includes both the first and the second locking mechanisms, 246a and 246b, respectively. When engaged, the first locking mechanism 246a prevents the first frame portion 204 and the second frame portion 206 to pivot about the pin 240a, and the second locking mechanism 246b prevents such frame portions 204 and 206 to pivot about the pin 240b. Thus, unless the table 100 or an outside edge 124 or 132, is subjected to sufficient deceleration to disengage the first and/or second locking mechanism(s) 246a and/or 246b, such locking mechanism 246 prevents inadvertent upward movement of the first frame portion 204 and the second frame portion 206 away from the central tube 244, and thus maintains the top surface 130 and the top surface 140 of the table top 102 (see FIG. 1) in a substantially coplanar configuration.

Referring to FIGS. 8-11, the locking mechanism 246a and 246b are substantially identical. The locking mechanism 246a includes a bearing or other striking component 300 secured by the pin 240a to the first and the third end sections 224 and 228, respectively, and the locking mechanism 246b includes a bearing or other striking component 300 secured by the pin 240b to the second and the fourth end section 226 and 230, respectively. The locking mechanisms 246a and 246b also include a latch 302 coupled to a weight 304.

In one embodiment, the weight 304 comprises a block 304a and a cylinder or other elongated member 304b. In some embodiments, the block 304a is a polyhedron. It should be apparent that the block 304a may comprise other shapes. The latch 302 is fastened to the block 304a, for example, by welding, by a screw or bolt, or any other fastener apparent to one of skill in the art. In some embodiments, the elongated member 304b is a solid. The block 304a and the elongated member 304b may be manufactured from a metal, a thermoplastic, or any suitable material that provides sufficient mass for operation of the locking device. The block 304a and the elongated member 304b are fastened to each other, for example, by welding, a screw or bolt, or any other suitable fastener.

The cylinder 304b has a first portion 306 opposite a second portion 308. The first portion 306 of the cylinder 304b is passed through a first aperture 310 in a first side wall 312 of the central tube 244. A first end cap 314 having a diameter larger than a diameter of the cylinder 304b is disposed at a first terminal end 316 of the first portion 306. A bolt or screw 318 secures the first end cap 314 to the first terminal end 316. However, the first end cap 314 may be fastened to the first terminal end 316 by any other fastening means apparent to one of skill in the art including riveting, welding, adhesive securing, and the like.

Like the first portion 306 of the cylinder 304b, the second portion 308 of the cylinder 304b is passed through a second aperture 318 in a second side wall 320 of the central tube 244 that is opposite the first side wall 312. A second end cap 322 having a diameter larger than a diameter of cylinder 304b is disposed at a second terminal end 324 of the second portion 308. The second end cap 322 is fastened to the second terminal end 324 as described above in connection with fastening of the first end cap 314, for example, by a second screw or bold 326.

A first spring 328 is disposed between the first end cap 314 and the first side wall 312 of central tube 244. A second spring 330 is disposed between the second end cap 322 and the second side wall 320 of the central tube 244. The first spring 328 is tensioned so that the first spring 328 biases the first end cap 314 away from the first side wall 312 and the second spring 330 is tensioned so that the second spring 330 biases the second end cap 332 away from the second side wall 320. The tensioned springs 328 and 330 hold the cylinder 304b centered relative to the central tube 244, and thereby keep the latch 302 centered above the bearing 300 to block any upward movement of such bearing 300.

If the table 100, and thus the locking mechanism 246, is subjected to an amount of deceleration in a direction A that overcomes inertia of the block 304a and the cylinder 304b and that further compresses the first spring 328, the weight 302 moves relative to central tube 244 in the direction B. Similarly, sufficient deceleration in the direction B causes the weight 302 to move in the direction A relative to the central tube 244. The locking mechanism 246 becomes disengaged when the distance of such relative movement of the weight 302 is enough to so that the latch 302 secured thereto moves sufficiently in the direction A or B relative to the bearing 300 such that the latch 302 cannot block upward travel (relative to the central tube 244) of the bearing 300. After the locking mechanism 246 is disengaged, any additional force applied to the table 100, for example, on the outside edge 124 or 132 (see FIG. 1) thereof will cause the first panel 112 and the second panel 114 to move from a configuration in which these panels are substantially coplanar to a configuration in which these panels are no longer coplanar (see FIGS. 1-4). As described above, when the panels 112 and 114 move in this manner, the deformable components of the deformation mechanism 118 absorb energy applied to the outside edge 124 or 132.

In one embodiment, the block 304a and latch 302 have a combined weight of 0.67 pounds. The springs 328 and 330 each have a spring rate of approximately 1 pound per inch, and such springs keep the mass of the block 304 and latch 302 centered. In this embodiment, deceleration of 1G causes one of the springs 328 and 338 to compress 0.67 inches, which is sufficient to move the latch 302 away from the bearing 240,242. It should be apparent that as the mass of the block 304a and latch 302 in increased, the stiffness of the spring should be increased proportionately.

Figure 12:
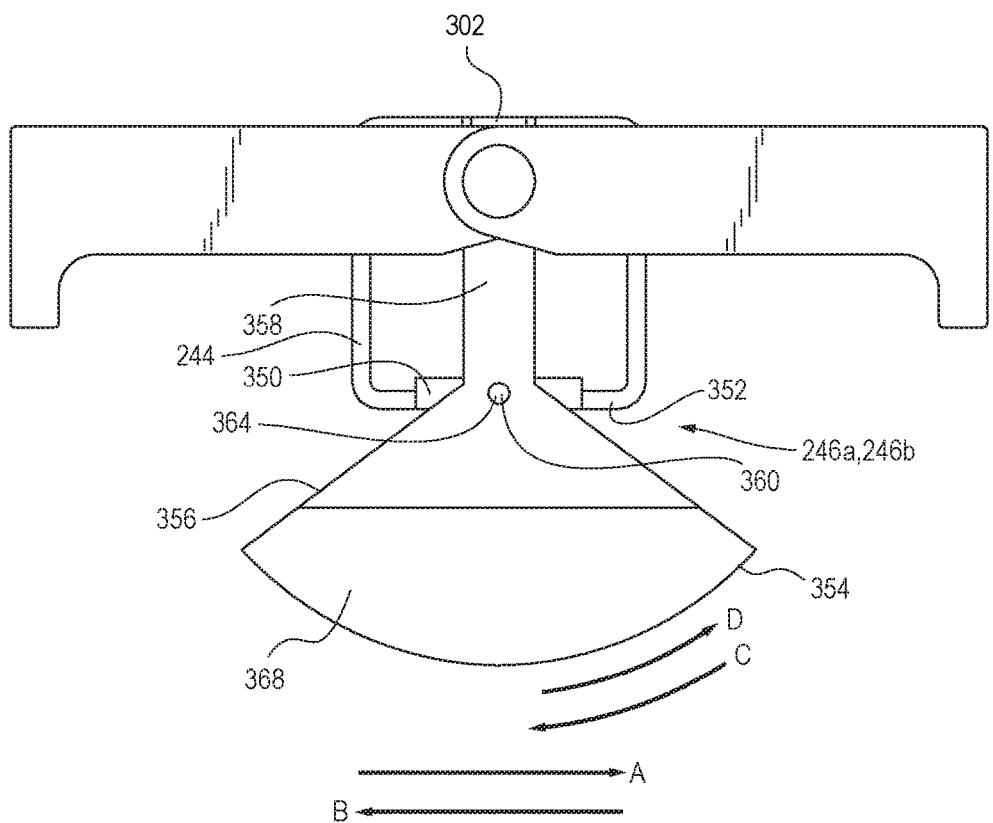
FIG. 12 is an elevational view of a front or rear of the table of FIG. 1, with certain elements omitted to show another embodiment of a locking mechanism of such table.
Figure 13:
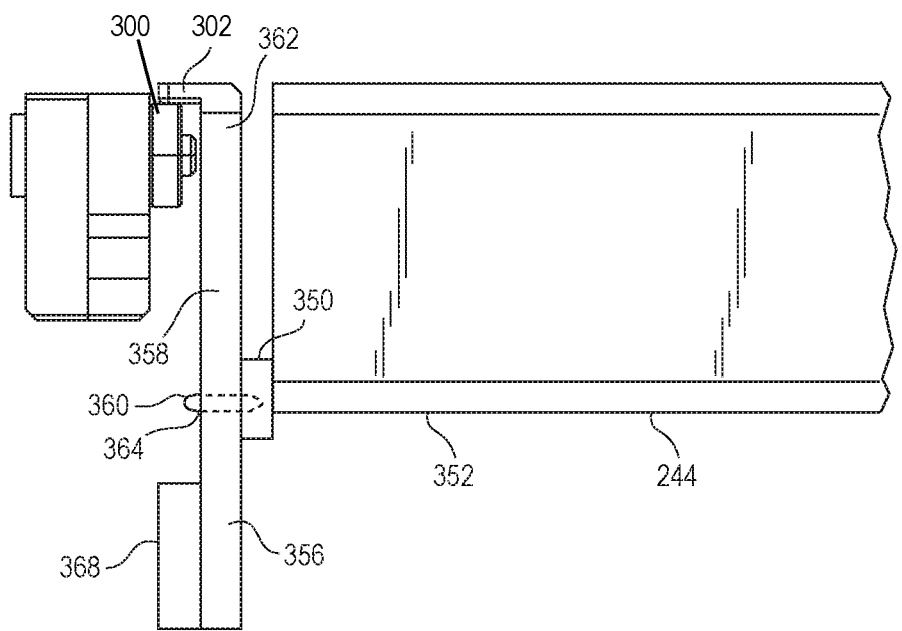
FIG. 13 is a side elevational view of the table of FIG. 1, with certain elements omitted to show the locking mechanism of FIG. 12.

Referring to FIGS. 12 and 13, in another embodiment, the locking mechanism 246 includes a plate 350 secured, for example, by welding to a bottom wall 352 of the central tube 244. A weight 354 having a first section 356 and a second section 358 is pendantly secured to the plate 350, for example, by a fastener 360. Such fastener may be a screw, a bolt, or any other suitable fastener that allows the second section 358 to pivot thereabout. The latch 302 is secured to a terminal end 362 of the second section 358. The weight 354 is disposed such that when no force is applied to the table 100 and the locking mechanism 246 is engaged, the weight 354 remains centered relative to the central tube 244 and the latch 302 is disposed directly above the bearing 300 and blocks upward travel thereof.

When the table 100 experiences sufficient force in a direction A such as, for example, from sudden deceleration or the sides 124 or 132 being struck, the first section 356 of the weight 354 below a pivot point 364 defined by the fastener 360 rotates about such pivot point 364 in a direction C. Simultaneously, a second section 358 of the weight 354 (and the latch 302) above the pivot point 364 rotates thereabout in a direction D, disengages the locking mechanism 246, and allows the upward travel of the bearing 300 and the first panel 112 and the second panel 114 coupled thereto relative to the central tube 244.

Similarly, when the table 100 experiences sufficient deceleration in a direction B, the first section 356 of the weight 354 rotates about the pivot point 364 in a direction D, and the second section 358 and the latch 302 rotate above the pivot point 364 in a direction, thereby disengaging the locking mechanism 246.

In some embodiments, the first section 356 may need to have an additional weighted element 368 secured thereto so that the weight 354 remains stationary, and the locking mechanism 246 remains engaged, until the table 100 is subjected to sufficient deceleration.

In one embodiment, the weights 304 and 354 are selected and configured so that subjecting the table 100 to approximately a 1G deceleration is sufficient to disengage the locking mechanism 246. In one embodiment, the combined weight 354 weighs approximately 0.85 pounds.

INDUSTRIAL APPLICABILITY

In summary, the locking mechanism 246 described herein prevent unintentional movement of a tabletop 102 of the table 100. Although, such locking mechanism 246 is described in the context of a table 100 suitable for use in a vehicle, such as a train, a bus, a recreational vehicle, and the like, the locking mechanism 246 may be adapted for preventing unintentional movement of tabletops of other types of tables.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A table, comprising
   a tabletop;
   a support to secure the tabletop to a surface;
   a central tube;
   a first frame and a second frame disposed on opposite sides of the central tube;
   a bearing coupled to the first frame and the second frame;
   a weight coupled to the central tube; and
   a latch coupled to the weight, wherein the latch is movable from a locking position to a release position;
   wherein when the latch is in the locking position the latch blocks movement of the bearing away from the central tube and when the latch is in the release position the bearing is allowed to move away from the central tube, and the latch moves from the locking position to the release position when one of acceleration or deceleration of at least a predetermined amount is applied to the table.

2. The table of claim 1, wherein the weight comprises a block secured to an elongated member, wherein the latch is secured to the block and the elongated member is coupled to the central tube.

3. The table of claim 2, wherein the elongated member includes a first portion and a second portion, wherein the first portion is passed through an aperture in a first side wall of the central tube and the second portion is passed through an aperture in a second side wall of the central tube.

4. The table of claim 3, further including one or more springs configured to hold the latch in the locking position unless at least the predetermined amount of one of acceleration and deceleration is applied.

5. The table of claim 2, wherein the elongated member is a cylinder and the block is a polyhedron.

6. The table of claim 1, further including a plate secured to the central tube, and the weight is rotatably secured to the plate by a fastener.

7. The table of claim 6, wherein application of at least the predetermined amount force causes the weight to rotate about the fastener.

8. The table of claim 7, wherein rotation of the weight causes the latch to move from the locking position to the release position.

9. The table of claim 1, further including a table top that comprises a first panel secured to the first frame and a second panel secured to the second frame.

10. The table of claim 9, wherein after the latch moves from the locking position to the release position, additional force applied to the first frame or the second frame causes upward movement of the bearing and thereby cause the first panel and the second panel to move from a configuration in which top surfaces of the first panel and the second panel are substantially coplanar to a configuration in which such top surfaces are not coplanar.

11. A method of locking a table, wherein the table comprises a central tube, a first frame, and a second frame, comprising the steps of:
   coupling a bearing to the first frame and the second frame;
   coupling a weight to the central tube;
   coupling a latch to the weight, wherein the latch is movable from a locking position to a release position; and
   disposing the weight so that the latch blocks movement of the bearing away from the central tube when the latch is in the locking position and when the latch is in the release position the bearing is allowed to move away from the central tube;
   wherein the latch moves from the locking position to the release position when at least a acceleration and deceleration of at least a predetermined amount is applied to the table.

12. The method of claim 11, wherein the weight includes a block secured to an elongated member, and the method includes the steps of securing the latch to the block and coupling the elongated member to the central tube.

13. The method of 12, further comprising the steps of passing a first portion of the elongated member through an aperture in a first sidewall of the central tube and passing a second portion of the elongated member through an aperture in a second sidewall of the central tube.

14. The method of claim 13, further comprising the steps of applying a spring force to hold the latch in the locking position unless at least the predetermined amount of one of acceleration or deceleration is applied.

15. The method of claim 12, wherein the elongated member is a cylinder and the block is a polyhedron.

16. The method of claim 11, further comprising the steps of securing a plate to the central tube and rotatably securing the weight to the plate using a fastener.

17. The method of claim 16, further comprising the step of rotating the weight about the fastener when at least the predetermined amount of force is applied.

18. The method of claim 17, wherein rotating the weight comprises moving the latch away from the locking position to the release position.

19. The method of claim 11, wherein a table top comprises a first panel and a second panel, and including the steps of securing the first panel to the first frame and a second panel to the second frame.

20. The method of claim 19, further including the step of when additional force is applied when the latch is in the release position, moving the first and second panels from a configuration in which top surfaces of the first and second panels are substantially coplanar to a configuration in which such top surfaces are not coplanar.

* * * * *